US010652951B1

(12) United States Patent
Sharma et al.

(10) Patent No.: US 10,652,951 B1
(45) Date of Patent: May 12, 2020

(54) COMMUNICATING WITH A WIRELESS DEVICE VIA AT LEAST TWO ACCESS NODES

(71) Applicant: Sprint Spectrum LP, Overland Park, KS (US)

(72) Inventors: Ankur Sharma, Plano, TX (US); Noman Alam, Chantilly, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/902,350

(22) Filed: Feb. 22, 2018

(51) Int. Cl.
*H04W 84/04* (2009.01)
*H04W 88/16* (2009.01)
*H04W 8/08* (2009.01)
*H04L 29/12* (2006.01)
*H04W 48/08* (2009.01)

(52) U.S. Cl.
CPC ....... *H04W 84/047* (2013.01); *H04L 61/6077* (2013.01); *H04W 8/08* (2013.01); *H04W 88/16* (2013.01); *H04W 48/08* (2013.01)

(58) Field of Classification Search
CPC ..... H04W 16/32; H04W 76/16; H04W 88/06; H04B 7/02
USPC ......................................... 370/328, 331, 401
See application file for complete search history.

(56) References Cited

U.S. PATENT DOCUMENTS

| 9,414,310 | B2* | 8/2016 | Grayson | H04W 52/0206 |
| 9,526,044 | B2 | 12/2016 | Choi et al. | |
| 2014/0355562 | A1* | 12/2014 | Gao | H04B 7/02 370/331 |
| 2015/0043486 | A1* | 2/2015 | Ozturk | H04W 88/06 370/329 |
| 2015/0326456 | A1* | 11/2015 | Dudda | H04L 43/062 370/252 |
| 2015/0365993 | A1* | 12/2015 | Aminaka | H04W 76/15 370/329 |
| 2016/0066233 | A1* | 3/2016 | Balachandran | H04W 76/16 370/331 |
| 2016/0150586 | A1* | 5/2016 | Lei | H04W 36/30 370/332 |
| 2016/0157293 | A1* | 6/2016 | Pazhyannur | H04W 76/27 370/329 |
| 2016/0374138 | A1* | 12/2016 | Dai | H04W 72/0426 |
| 2017/0164281 | A1* | 6/2017 | Chiba | H04L 5/0032 |
| 2017/0265175 | A1* | 9/2017 | Gandhi | H04W 76/20 |
| 2018/0035440 | A1* | 2/2018 | Ohta | H04W 28/06 |

FOREIGN PATENT DOCUMENTS

WO    2014/179982 A1    11/2014

* cited by examiner

*Primary Examiner* — Melanie Jagannathan

(57) ABSTRACT

Systems, methods, and processing nodes for communicating with a wireless device via at least two access nodes include receiving, at a gateway node, data addressed to a first network address of the wireless device, transmitting, via a donor access node, a first portion of the data within a first bearer addressed to a second network address of the wireless device, and transmitting, via a relay access node wirelessly coupled to the donor access node, a second portion of the data within a second bearer addressed to a third network address of the wireless device.

18 Claims, 8 Drawing Sheets

COMMUNICATING WITH A WIRELESS DEVICE VIA AT LEAST TWO ACCESS NODES

TECHNICAL BACKGROUND

Wireless networks incorporating access nodes, relay access nodes, and other small-cell access nodes are becoming increasingly common, and may be referred to as heterogeneous networks. Relay access nodes improve service quality by relaying communication between an access node, and wireless devices in the wireless network. For example, relay access nodes may be used at the edge of a coverage area of an access node to improve coverage and/or service, as well as in crowded areas having a high number of other wireless devices to increase the available throughput to the wireless devices being relayed. Relay access nodes are generally configured to communicate with the access node (i.e. a "donor" access node) via a wireless backhaul connection, and to deploy a radio air-interface to which wireless devices can attach.

"Dual Connectivity" refers to the ability for wireless devices to attach to at least two access nodes, and transmit/receive information via two wireless connections simultaneously. However, there are limits to utilizing dual connectivity in networks comprising access nodes and relay access nodes.

Overview

Exemplary embodiments described herein include systems, methods, and processing nodes for communicating with a wireless device via at least two access nodes. An exemplary method described herein for communicating with a wireless device via at least two access nodes, the method includes receiving, at a gateway node, data addressed to the wireless device, transmitting, via a donor access node, a first portion of the data within a first bearer addressed to a first network address of the wireless device, and transmitting, via a relay access node wirelessly coupled to the donor access node, a second portion of the data within a second bearer addressed to a second network address of the wireless device. The wireless device is wirelessly coupled to both the donor access node and the relay access node.

An exemplary system described herein for communicating with a wireless device via at least two access nodes includes a donor access node configured to provide a first radio air interface to which a wireless device is attached, and a relay access node configured to attach to the first radio air interface and to provide a second radio air interface to which the wireless device is further attached. Further, a controller node communicably coupled to the donor access node is configured to determine that the wireless device is attached to both the donor access node and the relay access node, generate at least two addresses for the wireless device, generate a mapping of each of the at least two addresses to a corresponding bearer, and forward the mapping to one or more gateway nodes communicably coupled to the controller node. A first gateway node communicably coupled to the controller node is configured to receive the mapping from the controller node, split a data packet addressed to the wireless device into a first data portion addressed to a first address of said at least two addresses and a second data portion addressed to a second address of said at least two addresses, transmit the first data portion to the donor access node using a first corresponding bearer mapped to the first address, and transmit the second data portion to the relay access node using a second corresponding bearer mapped to the second address. Each of the donor access node and the relay access node respectively forwards the first and second data portions to the first and second addresses of the wireless device.

An exemplary processing node described herein for communicating with a wireless device via at least two access nodes is configured to perform operations including dividing a data packet addressed to a wireless device into a first portion and a second portion, transmitting the first portion to a first address associated with the wireless device via a first access node, and transmitting the second portion to a second address associated with the wireless device via a second access node. The second access node is in wireless communication with the first access node, and receives the second portion from the first access node prior to forwarding the second portion to the wireless device.

DETAILED DESCRIPTION

Figure 1:
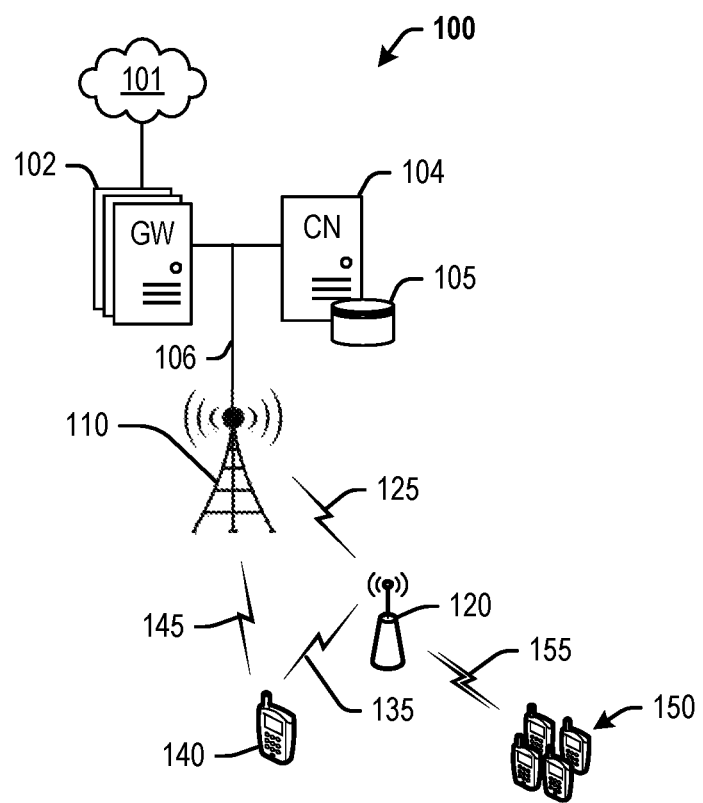
FIG. 1 depicts an exemplary system for communicating with a wireless device via at least two access nodes.

Exemplary embodiments described herein include systems, methods, and processing nodes for communicating with a wireless device via at least two access nodes. An exemplary system described herein includes at least a donor access node, such as an eNodeB in long-term evolution (LTE) networks, and a relay access node in wireless communication with the donor access node. The donor access node is configured to deploy a first wireless air-interface to which wireless devices and/or relay access nodes can attach. The relay access node is configured to communicate with the donor access node via a wireless backhaul connection (hereinafter, "backhaul") provided on the first wireless air-interface, and is further configured to deploy a second wireless air-interface to which wireless devices can attach and access network services from the donor access node. In other words, the relay access node is configured to relay data packets between the donor access node and wireless devices attached to the relay access node.

Further, wireless devices illustrated herein are generally capable of communicating with at least two access nodes. In LTE networks, this capability is termed "dual connectivity." The exemplary embodiments disclosed herein include systems, methods, and processing nodes that are configured to perform dual connectivity operations for wireless devices attached to a combination of a donor access node and a relay access node, as described above. For example, systems described herein include at least a donor access node and a relay access node to which a wireless device is attached, a controller node configured to generate at least two addresses for the wireless device and map each of the at least two addresses to a corresponding bearer, and a gateway node configured to divide data addressed to the wireless device into first and second data portions respectively addressed to the at least two addresses, and transmit the first and second portions to the donor access node and the relay access node respectively. The first portion may be transmitted in a first corresponding bearer mapped to the first address, and second portion transmitted in a second corresponding bearer mapped to the second address.

The data addressed to the wireless device may comprise a protocol data unit (PDU), such as a data packet or similar unit of data. The data may be divided into the first and second data portions by splitting the PDU or unit of data into first and second portions. The data may be split into the first portion and the second portions based in part on a load level of each of the donor and relay access nodes. Upon receiving the data, the core network (i.e. gateway node and/or controller node such as mobility management entity) may generate first and second internal IP addresses, which are both associated with the same wireless device, but are mapped to different bearers. Each bearer is associated with a different access node. For example, the first bearer is associated with the donor access node, and the second bearer is associated with the relay access node, wherein the second bearer further traverses a relay gateway and the donor access node in order to reach the relay access node. Thus, the first portion of the data may be encapsulated within the first bearer at the gateway node, and transmitted to the donor access node, while the second portion of the data may be encapsulated within the second bearer at the gateway node and transmitted to the relay access node. Further, each of the donor access node and the relay access node respectively forwards the first and second data portions to the first and second addresses of the wireless device.

Further, in addition to the systems and methods described herein, these operations may be implemented as computer-readable instructions or methods, and processing nodes on the network for executing the instructions or methods. For example, a processing node coupled to a donor access node, a scheduler within the donor access node, or a controller node may be configured to perform the operations described herein. These and other embodiments are further described with reference to FIGS. 1-8 below.

FIG. 1 depicts an exemplary system for scheduling resources for relay access nodes in a wireless network. System 100 comprises a communication network 101, gateway node(s) 102, controller node 104, access node 110, relay access node 120, and wireless device 140. In other embodiments, any other combination of donor access nodes, relay access nodes, and wireless devices may be evident to those having ordinary skill in the art in light of this disclosure. In this exemplary embodiment, access node 110 may be a macrocell access node configured to deploy a wireless air-interface to which relay access node 120 and wireless device 140 can attach. For example, relay access node 120 may be configured to communicate with access node 110 over communication link 125, hereinafter referred to as a wireless backhaul or simply "backhaul, while wireless device 140 may be configured to communicate with access node 110 over a wireless communication link 145. Relay access node 120 is further configured to deploy an additional wireless air-interface to which wireless device 140 and wireless devices 150 can attach. Relay access node 120 is thus configured to relay data between donor access node 110 and wireless devices 140, 150, such that wireless devices 140, 150 may access network services using relay access node 120, rather than overload donor access node 110, which may be serving numerous other devices, such as wireless device 140. Moreover, wireless devices 150 that are outside a coverage area of access node 110 may access network services from donor access node 110 by virtue of being connected to relay access node 120.

Further, as described herein, wireless device 140 is capable of dual connectivity, i.e. simultaneously communicating with both donor access node 110 and relay access node 120. For example, wireless device 140 is configured with multi-access PDN connectivity (MAPCON), whereby wireless device 140 can send and receive data packets using two network addresses associated therewith. Further, to enable dual connectivity in system 100, a processing node communicatively coupled to one or both of gateway node(s) 102 and controller node 104 may be configured to generate the at least two addresses for wireless device 140, map each of the at least two addresses to a corresponding bearer, divide data received from network 101 and addressed to wireless device 140 into first and second portions respectively addressed to the at least two addresses, and transmit the first and second portions to wireless device 140 via donor access node 110 and relay access node 120 respectively.

The first portion may be transmitted in a first corresponding bearer mapped to the first address, and second portion transmitted in a second corresponding bearer mapped to the second address. For example, in LTE systems, the bearers comprise evolved packet-switched system (EPS) bearers. Further in LTE systems, gateway node(s) 102 comprise at least a serving gateway (S-GW) configured to transmit the first portion to access node 110, and a relay S-GW configured to receive the second portion from the S-GW and forward the second portion to relay access node 120 via backhaul 125. Further in LTE systems, controller node 104 comprises a mobility management entity (MME), which is further configured to receive attach requests from at least wireless device 140, and determine that wireless device 140 is capable of attaching to both donor access node 110 and relay access node 120 simultaneously, based on the attach requests. Alternatively or in addition, the MME may be configured to determine a MAPCON capability of wireless device 140 based on a device capabilities message received at donor access node 110.

The data addressed to wireless device 140 may comprise a protocol data unit (PDU), such as a data packet or similar unit of data. The data may be divided into the first and second portions by splitting the PDU into the first and second portions. Any wireless device capable of dual connectivity, i.e. communicating with at least two access nodes, and within a coverage area of said at least two access nodes, may request dual network addresses. Such functionality may be referred to as Multi-Access PDN Connectivity (MAPCON). Upon receiving the data, an S-GW within gateway node(s) 102 may transmit the first portion of the data within a first bearer to donor access node 110, and the second portion of the data within a second bearer to relay access node 120 (via at least a relay S-GW). Each of donor access node 110 and relay access node 120 respectively forwards the first and second data portions to the first and second addresses of wireless device 140.

Access node 110 can be any network node configured to provide communication between wireless devices 140, 150 and communication network 101, including standard access nodes such as a macro-cell access node, base transceiver station, a radio base station, an eNodeB device, an enhanced eNodeB device, or the like. In an exemplary embodiment, a macro-cell access node 110 can have a coverage area in the range of approximately five kilometers to thirty-five kilometers and an output power in the tens of watts. Further relay access node 120 may comprise any short range, low power, small-cell access nodes such as a microcell access node, a picocell access node, a femtocell access node, or a home eNodeB device. In addition, relay access node 120 may comprise a small-cell access node paired with a relay wireless device configured to communicate over backhaul 125, as further described herein.

Access node 110 and relay access node 120 can each comprise a processor and associated circuitry to execute or direct the execution of computer-readable instructions to perform operations such as those further described herein. Briefly, access node 110 and relay access node 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 and relay access node 120 can receive instructions and other input at a user interface. Access node 110 communicates with gateway node 102 and controller node 104 via communication links 106, 107. Access node 110 and relay access node 120 may communicate with each other, and other access nodes (not shown), using wireless link or backhaul 125, or a wired link such as an X2 link. Components of exemplary access nodes 110 and relay access node 120 are further described with reference to FIGS. 2-4.

Wireless devices 140, 150 may be any device, system, combination of devices, or other such communication platform capable of communicating wirelessly with access node 110 and/or relay access node 120 using one or more frequency bands deployed therefrom. Each of wireless devices 140, 150 may be, for example, a mobile phone, a wireless phone, a wireless modem, a personal digital assistant (PDA), a voice over internet protocol (VoW) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 140, 150. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrie Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node(s) 102 can be any network node configured to interface with other network nodes using various protocols. Gateway node(s) 102 can communicate user data over system 100. Gateway node(s) 102 can be standalone computing devices, computing systems, or network components, and can be accessible, for example, by a wired or wireless connection, or through an indirect connection such as through a computer network or communication network. For example, gateway node(s) 102 can include a serving gateway (S-GW) and/or a public data network gateway (P-GW), etc. Gateway node(s) 102 can further include a relay S-GW and relay P-GW that perform equivalent functions as S-GW and P-GW but for relay access node 120. One of ordinary skill in the art would recognize that gateway node(s) 102 are not limited to any specific technology architecture, such as Long Term Evolution (LTE) and can be used with any network architecture and/or protocol.

Each of gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as configurations and capabilities of access node 110, relay access node 120, wireless devices 140, 150, external and internal network addresses of wireless device 140, mappings of internal network addresses with corresponding bearers, and so on. This information may be requested by or shared with gateway node(s) 102 and/or access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described herein may also be stored on a non-transitory computer readable medium. Many of the elements of system 100 may be, comprise, or include computers systems and/or processing nodes. This includes, but is not limited to: gateway node(s) 102, controller node 104, access node 110, relay access node 120, and/or network 101.

Figure 2:
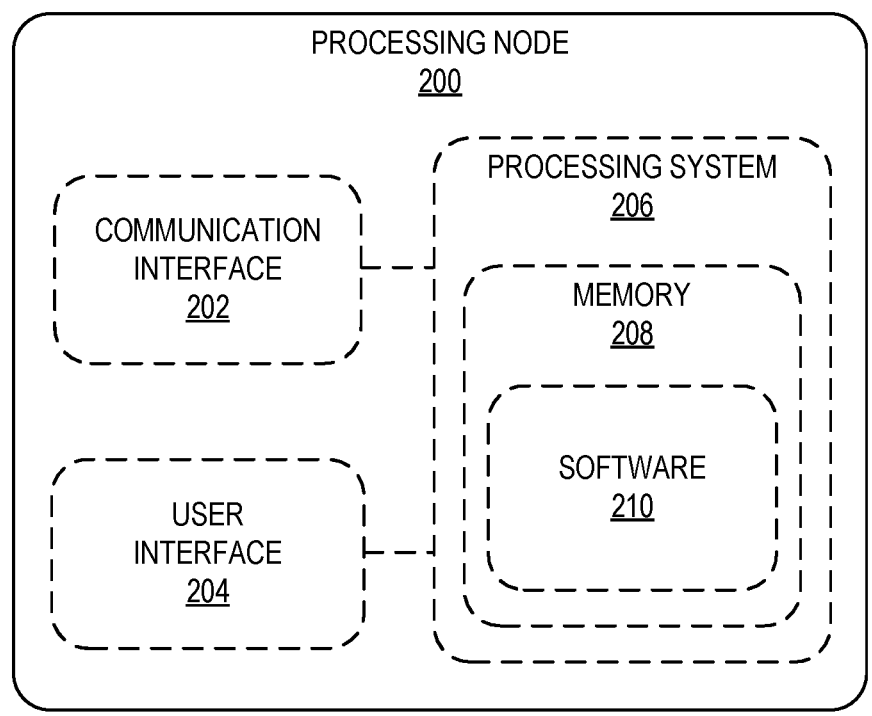
FIG. 2 depicts an exemplary processing node for communicating with a wireless device via at least two access nodes.

FIG. 2 depicts an exemplary processing node for scheduling resources for relay access nodes in a wireless network. Processing node 200 comprises a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include a module for performing transmission power control operations described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
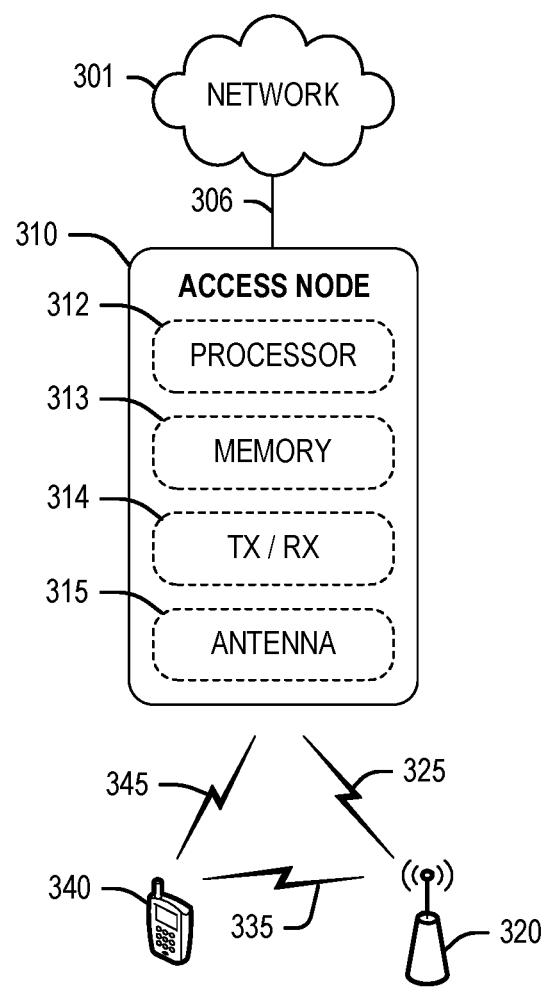
FIG. 3 depicts an exemplary access node.

FIG. 3 depicts an exemplary access node 310. Access node 310 may comprise, for example, a macro-cell access node, such as access node 110 described with reference to FIG. 1. Access node 310 is illustrated as comprising a processor 312, memory 313, transceiver 314, and antenna 315. Processor 312 executes instructions stored on memory 313, while transceiver 314 and antenna 315 enable wireless communication with wireless device 340 and relay access node 320. Instructions stored on memory 313 can include deploying an air-interface carrier to which wireless device 340 can attach to access network services directly, and to which relay access node 320 can attach and relay data packets between access node 310 and wireless device 340. Thus, access node 310 may be referred to as a donor access node. Access node 310 may further be configured to receive data packets encapsulated within a first bearer addressed to a first network address of wireless device 340, and transmit said data packets within the first bearer to wireless device 340 via communication link 345. Access node 310 may further be configured to receive data packets encapsulated within a second bearer addressed to a second network address of wireless device 340, and transmit said data packets within the second bearer to relay access node 320 via backhaul 325, wherein relay access node 320 forwards the data packets within the second bearer to wireless device 340 via communication link 335.

Figure 4:
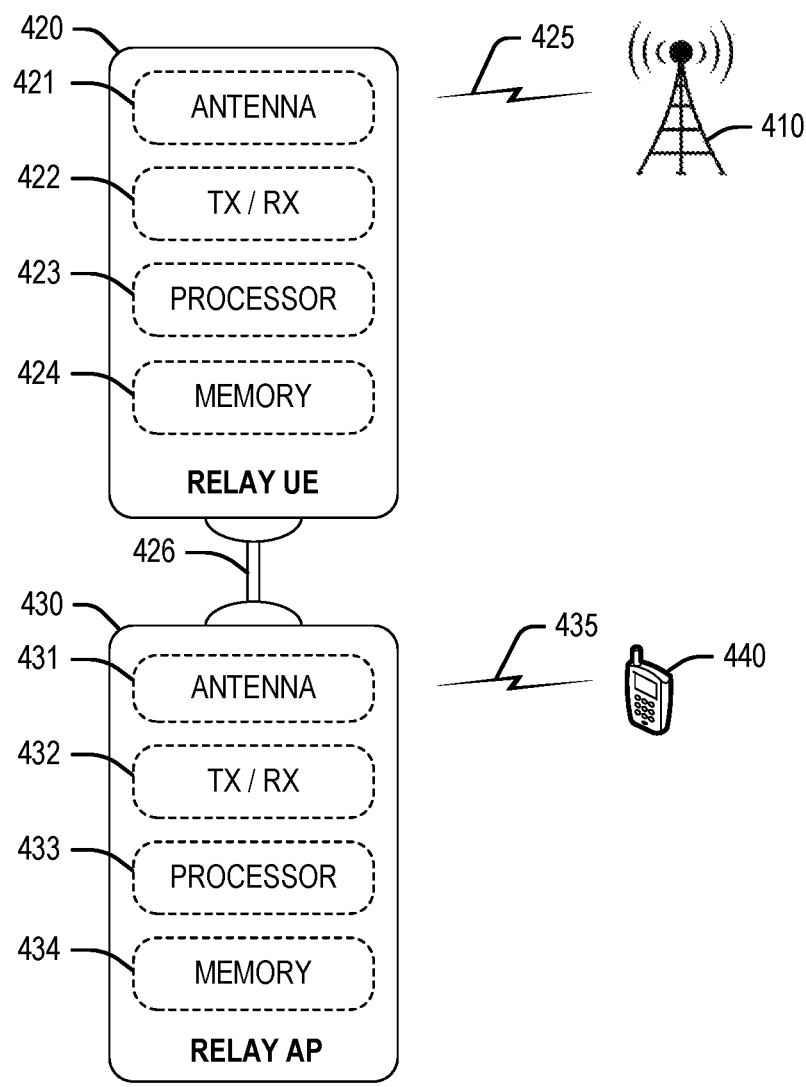
FIG. 4 depicts an exemplary relay access node comprising a relay wireless device and a relay access point.

FIG. 4 depicts an exemplary relay access node comprising a relay wireless device (UE) 420 and a relay access point (AP) 430. Relay wireless device 420 is illustrated as comprising an antenna 421 for direct (i.e. unrelayed) communication with donor access node 410 via wireless backhaul link 425, a transceiver 422, a processor 423, and a memory 424 for storing instructions that enable relay wireless device 420 to perform operations described herein. In some embodiments, relay wireless device 420 is referred to as a customer premise equipment (CPE), which includes any stationary LTE wireless device having a stronger computational & RF capability versus standard wireless devices, as well as a directional antenna and a dedicated power supply, enabling relay wireless device 420 to efficiently provide resources to wireless device 440 via relay access point 430. Consequently, relay access point 430 may be co-located with relay wireless device 420, and is connected to relay wireless device 420 via a communication interface 426. Communication interface 426 may be any interface that enables direct communication between relay wireless device 420 and relay access point 430, such as USB, FireWire, Ethernet, or any other serial, parallel, analog, or digital interface.

In operation, relay wireless device 420 may be configured to relay network services from donor access node 410 to wireless device 440 via relay access point 430. Relay wireless device 420 may begin to function as a relay wireless device by sending a message to donor access node 410 to indicate to donor access node 410 that wireless device 420 is functioning as a relay wireless device. In some embodiments, relay wireless device 420 can request to send a buffer status report to donor access node 410. Donor access node 410 can grant this request in a conventional manner. Relay wireless device 420 may respond to the grant by sending a short buffer status report. This short buffer status report is associated with a logical channel group that indicates the buffer status report is communicating the status of relay wireless device 420 as a relay, and thus is not asking for additional resource allocations (like a 'conventional' buffer status report would indicate). In other words, when relay wireless device 420 responds with a buffer status report for the 'special' logical channel group, it means that the buffer status report is not actually reporting the status of a buffer. Rather, this buffer status report indicates that the wireless device is now functioning as a relay. Once status of relay wireless device 420 is established, relay wireless device 420 may instruct relay access point 430 to start accepting connection requests from one or more wireless devices such as wireless device 440. Further, based on the indication of relay status, donor access node 410 may alter how relay wireless device 420 is treated. For example, relay wireless device 420 may be provided with preferential treatment because it is functioning as a relay.

Relay access point 430 is illustrated as comprising an antenna 431 and transceiver 432 for enabling communication with wireless device 440, processor 433, and a memory 434 for storing instructions that are executed by processor 433. In some embodiments, relay access point 430 may be a home eNodeB. Moreover, although only one transceiver is depicted in each of relay wireless device 420 and relay access point 430, additional transceivers may be incorporated in order to facilitate communication across interface 426 and other network elements. In operation, relay access point 430 may be configured to receive data packets encapsulated within a second bearer addressed to a second network address of wireless device 440 via backhaul 425, and transmit said data packets within the second bearer to wireless device 440 via communication link 435

Figure 5:
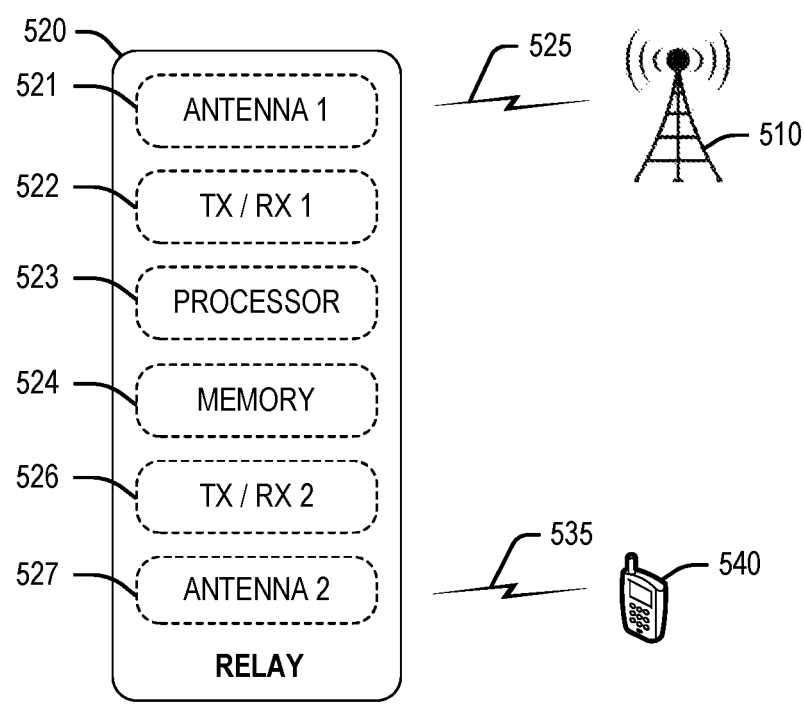
FIG. 5 depicts another exemplary relay access node.

In another exemplary embodiment, the relay access node may integrate components of a relay wireless device and a relay access point into a single unit. FIG. 5 depicts such an exemplary relay access node 520. Relay access node 520 is illustrated as comprising an antenna 521 for direct (i.e. unrelayed) communication with donor access node 510 via wireless backhaul link 525, a transceiver 522, a processor 523, and a memory 524 for storing instructions that are executed by processor 522 as described herein. Relay access node 520 further includes another transceiver 526 and antenna 527 for enabling communication with wireless device 520. Relay access node 520 can perform operations similar to those described with respect to FIG. 4.

In an embodiment, the relay access nodes depicted in FIG. 4-5 can be configured to function as one or more of a layer 1 (L1), layer 2 (L2), or layer 3 (L3) relay. A layer 1 relay functions as a booster or repeater. In other words, a layer 1 relay access node performs an amplify and forward (AF) function. RF signals received from a donor access node are amplified and transmitted to wireless devices. Likewise, RF signals received from wireless devices are amplified and transmitted to donor access nodes. Alternatively or in addition, a layer 2 relay access node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively or in addition, a layer 3 relay access node also performs a decode and forward function. However, a layer 3 relay access node also performs additional processing (such as ciphering and/or data concatenation/segmentation/resassembly). In other words, relay access node depicted herein performs demodulation and decoding of the received RF signals (either uplink or downlink), processes received data, then encodes, modulates, and transmits the data to a wireless device.

Figure 6:
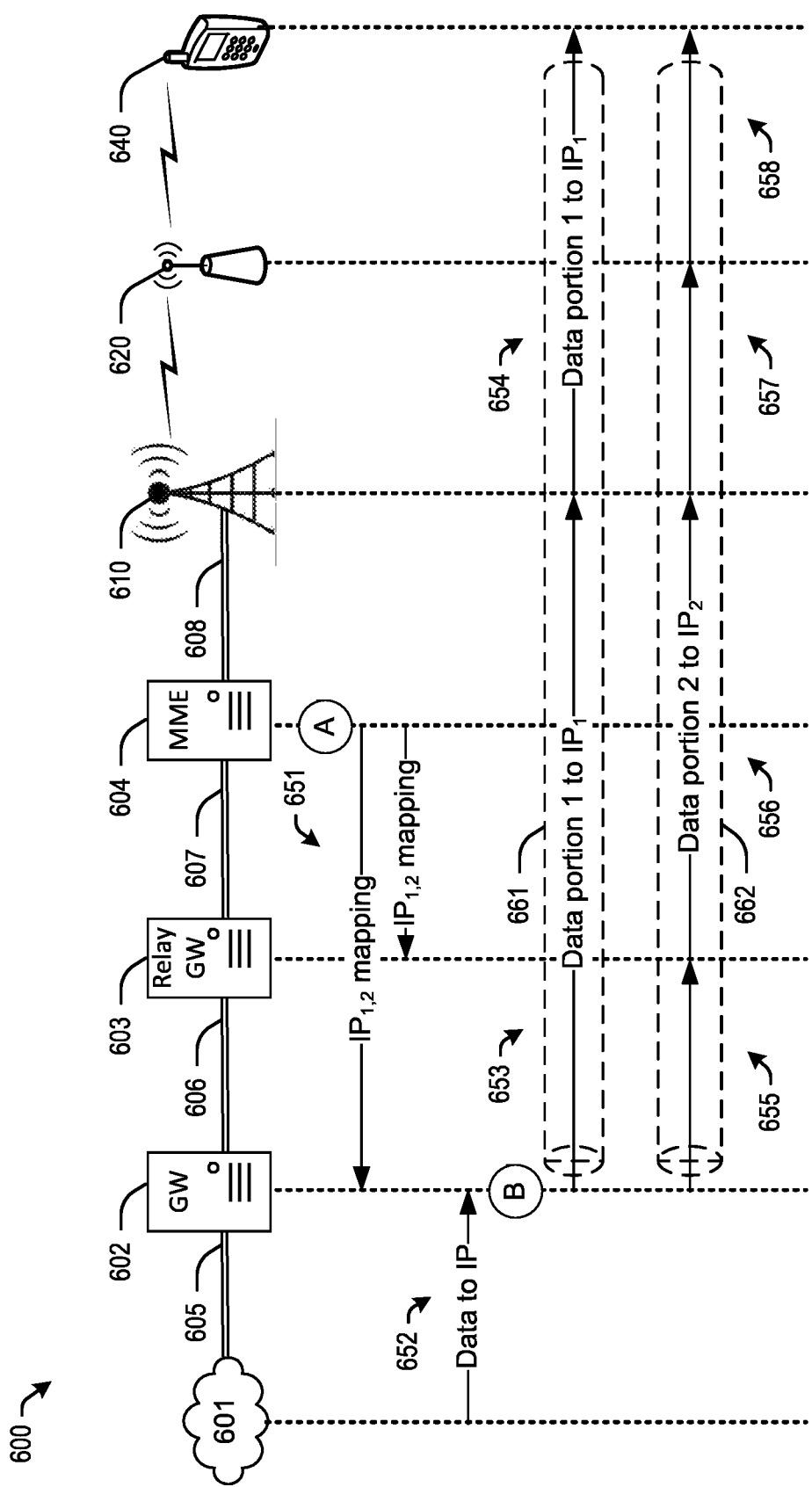
FIG. 6 depicts an exemplary network flow for communicating with a wireless device via at least two access nodes.

FIG. 6 depicts an exemplary network flow for communicating with a wireless device via at least two access nodes. The exemplary network flow of FIG. 5 may be implemented using components similar to those depicted in system 100, such as a network 601, gateways 602 and 603, controller node (MME) 604, donor access node 610, relay access node 620, and wireless device 640. In this embodiment, communication links 605 may comprise any interface capable of connecting a serving gateway (S-GW) 602 to a packet-based network 601, such as an S5 interface. Communication link 606 comprises any interface capable of connecting gateway 602 to relay gateway 603, such as an S4 or S5 interface. Communication link 607 comprises any interface capable of connecting relay gateway 603 to MME 604, such as an S11 interface. Communication link 608 comprises any interface capable of connecting MME 604 to donor access node 610, such as an S1-MME or S1-U interface. Finally, donor access node 610, relay access node 620, and wireless device 640 communicate with one another via any number of wireless air-interfaces using LTE-uu or other wireless interfaces. Although FIG. 6 depicts components arranged (and steps performed) in a particular order for purposes of illustration and discussion, the components and operations discussed herein are not limited to any particular order or arrangement. One skilled in the art, using the disclosures provided herein, will appreciate that various features described herein can be omitted, rearranged, combined, and/or adapted in various ways. For example, although not shown herein, any number of additional gateways such as PDN gateways (P-GW), proxy servers, home subscriber servers (HSS), and signaling performed between elements, may be apparent to those having ordinary skill in the art in light of this disclosure.

Further, as described herein, wireless device 640 is capable of dual connectivity, i.e. simultaneously communicating with both donor access node 610 and relay access node 620. For example, wireless device 640 is configured with multi-access PDN connectivity (MAPCON), whereby wireless device 640 can send and receive data packets using two network addresses associated therewith. Further, at least MME 104 may be configured to perform method "A" further described in FIG. 7. For example, at 651, MME 604 is configured assign at least two addresses $IP_1$ and $IP_2$ for wireless device 640, map each of the at least two addresses to a corresponding bearer, and transmit the mapping of each IP address and corresponding bearer to both access node donor 610 and relay access node 620. The determination to generate the two addresses may be triggered based on attach requests received at MME 604 from wireless device 640 (via one or both of donor access node 610 and relay access node 620) that indicate that wireless device 640 is capable of attaching to both donor access node 610 and relay access node 620 simultaneously. Alternatively or in addition, MME 604 may be configured to determine a MAPCON capability of wireless device 640 based on a device capabilities message received at donor access node 610. Further, the addresses $IP_1$ and $IP_2$ may comprise internal network addresses, i.e. IP addresses that are generated within the context of system 600, as opposed to an external network address that is typically utilized by network entities accessible via network 601 in efforts to transmit data to wireless device 640. Thus, at 651, MME 604 transmits the mapping of each IP address $IP_1$ and $IP_2$ to one or both of gateways 602, 603 via, for instance, the S11 interface.

At 652, data is received at gateway 602 and addressed to wireless device 652. Upon receiving this data, gateway 602 performs method "B" further described in FIG. 8. For example, gateway 602 is configured to divide the data received from network 601 and addressed to wireless device 640 into first and second portions respectively addressed to the at least two addresses $IP_1$ and $IP_2$, and transmit the first and second portions to wireless device 640 via donor access node 610 and relay access node 620 respectively, based on the bearer mapping provided by MME 604 at 651. The first portion may be transmitted in a first corresponding bearer 661 mapped to the first address $IP_1$, and the second portion may be transmitted in a second corresponding bearer 662 mapped to the second address $IP_2$. Bearers 661 and 662 may comprise evolved packet-switched system (EPS) bearers. EPS bearer 661 is set up to transmit the first data portion to donor access node 610 (via, for instance, an S1 interface 608), which then transmits the first data portion directly to wireless device 640 over a wireless air-interface. For example, gateway 602 may transmit data within bearer 661 to a network addresses associated with donor access node 610, which in turn transmits the data to the first network address $IP_1$ associated with wireless device 640. In addition, EPS bearer 662 is set up to transmit the second data portion to relay gateway 603 (via, for instance, an S4 or S5 interface 606), which then transmits the second data portion to wireless device 640 via donor access node 610 and relay access node 620. For example, relay gateway 603 may transmit data within bearer 662 to a network addresses associated with donor access node 610, which in turn transmits the data to a network address associated with relay access node 620, which in turn transmits the data to the second network address $IP_2$ associated with wireless device 640. Thus, the mapping of each bearer 661, 662 may further include information related to network addresses of each of donor access node 610 and relay access node 620. Alternatively or in addition, each of gateways 602, 603, and access node 610, 620 are configured to communicate data within a specific bearer to the appropriate node.

Although not illustrated herein, similar operations may be performed for uplink data transmitted from wireless device 640. For example, wireless device 640 may be configured to transmit data addressed to a destination node on network 601 via both donor access node 610 and relay access node 620. In this instance, bearers 661, 662 may be utilized to receive portions of the data from wireless device 640, and transmit them to gateway 602 in the reverse order as described above. The portions may be reconstructed at gateway 602 and transmitted to the destination node as if they were transmitted from the public network address of wireless device 640.

Figure 7:
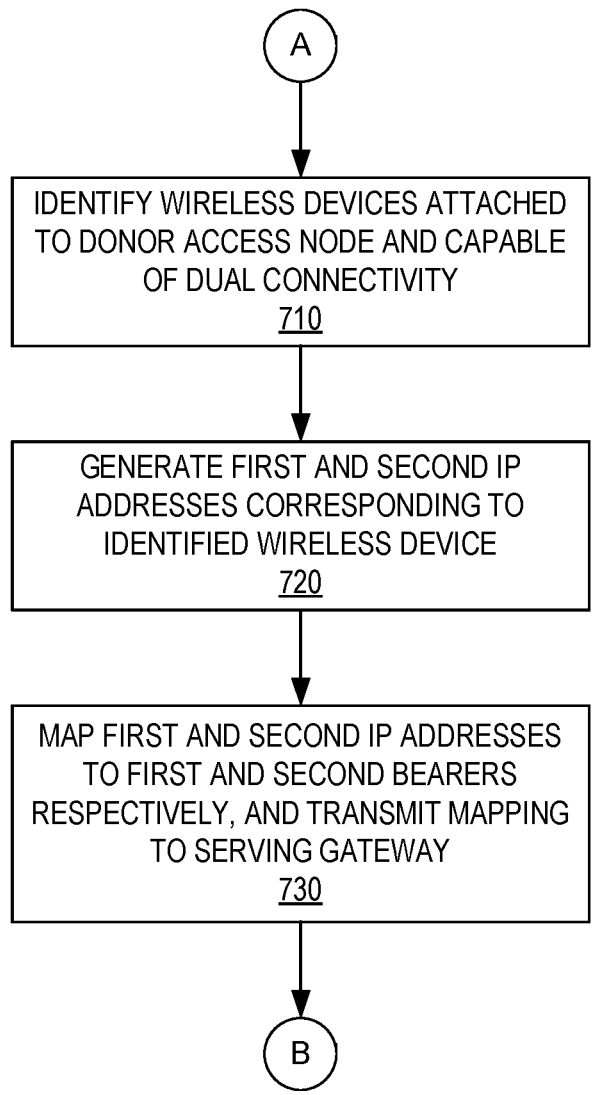
FIG. 7 depicts an exemplary method for communicating with a wireless device via at least two access nodes.

FIG. 7 depicts an exemplary method for communicating with a wireless device via at least two access nodes. The exemplary method of FIG. 7 may be implemented using components similar to those depicted in systems 100 and 600, such as controller node (or MME) 104, 604. Although FIG. 7 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 710, wireless devices capable of dual connectivity are identified. The identification may be based on attach requests received at a controller node (such as, for instance, MME 604 in FIG. 6) from a wireless device attached to both a donor access node and a relay access node. The attach requests may indicate that the wireless device is capable of attaching to both donor access node and relay access node simultaneously. Alternatively or in addition, a MAPCON capability of the wireless device may be determined based on a device capabilities message received at one or both of the donor access node and the relay access node.

At 720, first and second IP addresses are generated for the wireless device. Generation of the IP addresses is triggered by the determination of dual-connectivity in 710. Further, the addresses may comprise internal network addresses, i.e. IP addresses that are generated within the context of the wireless network, as opposed to an external network address that is typically utilized by network entities outside the wireless network, i.e. network nodes in communication with a gateway node.

At 730, the first and second IP addresses are each mapped to a corresponding bearer, and the mapping is transmitted to a serving gateway. The mapping may be transmitted to the serving gateway via internal network interfaces, such as an S11 interface. Upon receiving the mapping, the serving gateway is able to perform method B, further described with reference to FIG. 8 below.

Figure 8:
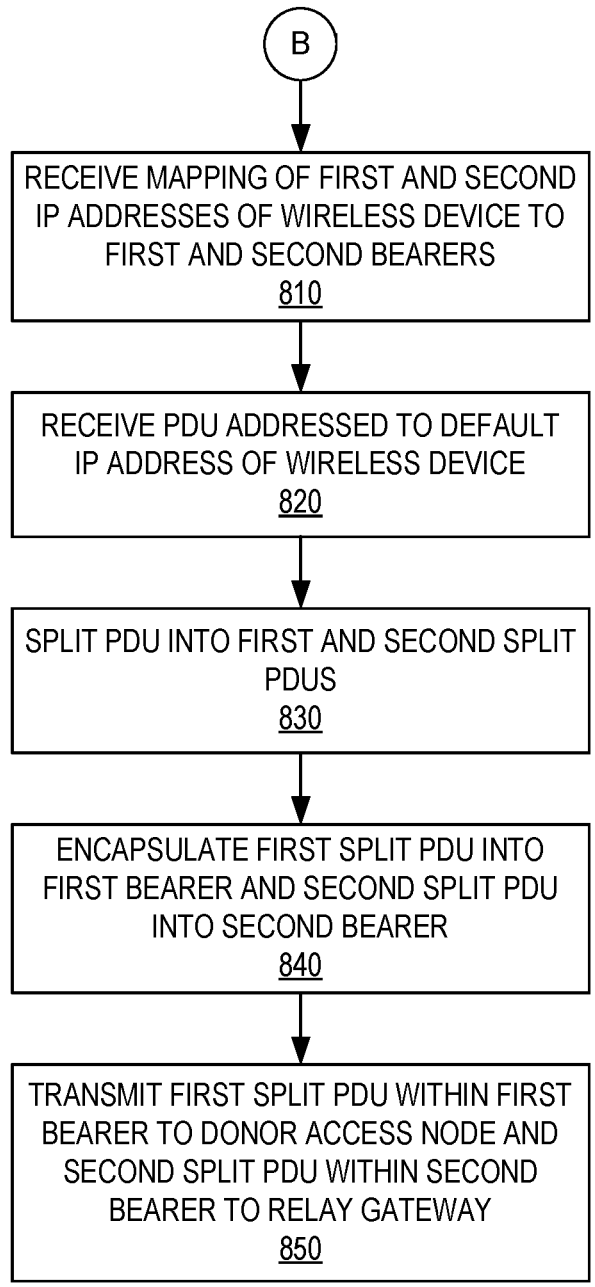
FIG. 8 depicts another exemplary method for communicating with a wireless device via at least two access nodes.

FIG. 8 depicts another exemplary method for communicating with a wireless device via at least two access nodes. The exemplary method of FIG. 8 may be implemented using components similar to those depicted in systems 100 and 600, such as a gateway node 102, 602. Although FIG. 8 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 810, a mapping of first and second IP generated for a wireless device are received. The IP addresses may be associated with a wireless device capable of dual-connectivity, and may comprise internal network addresses, i.e. IP addresses that are generated within the context of the wireless network, as opposed to an external network address that is typically utilized by network entities outside the wireless network, i.e. network nodes in communication with a gateway node. The mapping includes a mapping of each of the first and second IP addresses with a corresponding bearer, such as an EPS bearer. The mapping may be received at a serving gateway from a controller node (or MATE) via internal network interfaces, such as an S11 interface.

Upon receiving the mapping, at 820 data is received as being addressed to a public (or external) network address of the wireless device. The data may comprise a protocol data unit (PDU), such as a data packet on a user plane of the wireless network. At 830, the data is divides into first and second portions with the goal of transmitting the first portion via a first corresponding bearer and the second portion via a second corresponding bearer. At 840, the first and second portions (PDUs) are encapsulated within bearers respectively mapped to the first and second destination addresses of the wireless device. For example, the first portion may be transmitted in a first corresponding bearer mapped to the first address, and the second portion may be transmitted in a second corresponding bearer mapped to the second address. Bearers may comprise evolved packet-switched system (EPS) bearers. At 850, the first and second data portions are transmitted to the wireless device via a donor access node and a relay access node respectively, based on the bearer mapping. For example, the first EPS bearer is set up to transmit the first data portion to the donor access node (via, for instance, an S1 interface), which then transmits the first data portion directly to the wireless device over a wireless air-interface. Further, the second EPS bearer is set up to transmit the second data portion to a relay gateway (via, for instance, an S5 interface), which then transmits the second data portion to the wireless device via donor access node and the relay access node connected thereto.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for communicating with a wireless device via at least two access nodes, the method comprising:
   generating, at a controller node, a first network address and a second network address for the wireless device;
   generating, at the controller node, a mapping of the first network address and the second network address to a first and second bearer;
   forwarding the mapping and addresses to a gateway node;
   receiving, at the gateway node, the mapping and data addressed to the wireless device;
   splitting, at the gateway node, the data into a first data portion addressed to the first network address and a second data portion addressed to the second network address;
   transmitting, via the gateway node, the first data portion with the first bearer and the second data portion within the second bearer;
   receiving, at a donor access node, the first data portion via the first bearer addressed to the first network address of the wireless device;
   receiving, at a relay access node wirelessly coupled to the donor access node, the second data portion via the second bearer addressed to the second network address of the wireless device; and
   receiving, at the wireless device, the first and second data portions, wherein the wireless device is wirelessly coupled to both the donor access node and the relay access node.

2. The method of claim 1, wherein splitting the data into the first portion and the second portion is based in part on a load level of each of the donor and relay access nodes.

3. The method of claim 2, wherein the data comprises a protocol data unit (PDU).

4. The method of claim 3, wherein the PDU comprises a data packet.

5. The method of claim 1, further comprising:
   encapsulating the first portion of the data within the first bearer; and
   transmitting the encapsulated first portion to the donor access node,
   wherein the donor access node forwards the encapsulated first portion to the first network address of the wireless device.

6. The method of claim 1, further comprising:
   encapsulating the second portion of the data within the second bearer; and
   transmitting the encapsulated second portion to a relay gateway node,
   wherein the relay gateway node forwards the encapsulated second portion to the relay access node via the donor access node.

7. The method of claim 6, wherein the relay access node forwards the encapsulated second portion to the second network address of the wireless device.

8. A system for communicating with a wireless device via at least two access nodes, the system comprising:
   a donor access node configured to provide a first radio air interface to which a wireless device is attached;
   a relay access node configured to attach to the first radio air interface and to provide a second radio air interface to which the wireless device is further attached;
   a controller node communicably coupled to the donor access node, the controller node being configured to:
      determine that the wireless device is attached to both the donor access node and the relay access node;
      generate at least two addresses for the wireless device;
      generate a mapping of each of the at least two addresses to a corresponding bearer; and
      forward the mapping to one or more gateway nodes communicably coupled to the controller node; and
   a first gateway node communicably coupled to the controller node and being configured to:
      receive the mapping from the controller node;
      split a data packet addressed to the wireless device into a first data portion addressed to a first address of said at least two addresses and a second data portion addressed to a second address of said at least two addresses;
      transmit the first data portion to the donor access node using a first corresponding bearer mapped to the first address; and
      transmit the second data portion to the relay access node using a second corresponding bearer mapped to the second address;

wherein each of the donor access node and the relay access node respectively forward the first and second data portions to the first and second addresses of the wireless device.

9. The system of claim 8, further comprising a second gateway node configured to:
receive the second data portion from the first gateway node; and
forward the second data portion to the relay access node via the first radio air interface of the donor access node.

10. The system of claim 8, wherein the controller node comprises a mobility management entity (MME).

11. The system of claim 10, wherein the MME determines that the wireless device is attached to both the donor access node and the relay access node based on attach requests received from the wireless device.

12. The system of claim 8, wherein each of the at least two addresses comprises an Internet Protocol (IP) address.

13. The system of claim 12, wherein the mapping of each of the at least two addresses to the corresponding bearer comprises associating each IP addresses with an evolved packet switched (EPS) bearer.

14. A processing node for communicating with a wireless device via at least two access nodes, comprising:
a processor configured to:
divide a data packet addressed to a wireless device into a first portion and a second portion;
instruct, via a gateway node, a first access node to transmit the first portion to a first address associated with the wireless device; and
instruct, via the gateway node, a second access node to transmit the second portion to a second address associated with the wireless device,
wherein the second access node is in wireless communication with the first access node, and
wherein the second access node receives the second portion from the first access node prior to forwarding the second portion to the wireless device.

15. The processing node of claim 14, wherein the data packet is addressed to a third address associated with the wireless device prior to being divided.

16. The processing node of claim 15, wherein:
the third address comprises an external IP address, and
the first and second addresses respectively comprise first and second internal IP addresses.

17. The processing node of claim 16, wherein the first and second internal IP addresses are respectively mapped to first and second bearers, the first bearer linking the processing node with the first access node, and the second bearer linking the processing node with the second access node.

18. The processing node of claim 16, wherein the first and second internal IP addresses are received from a controller node in communication with the processing node.

* * * * *